(12) United States Patent
Donnet et al.

(10) Patent No.: US 7,833,505 B2
(45) Date of Patent: Nov. 16, 2010

(54) METHODS AND SYSTEMS FOR SYNTHESIS ON NANOSCALE MATERIALS

(75) Inventors: Jean-Baptiste Donnet, Didenheim (FR); Marie Pontier Johnson, Spring, TX (US); Don T. Norman, Fredericksburg, TX (US); Thang Le Huu, Nancy (FR); Hanae Oulanti, Mulhouse (FR)

(73) Assignee: Continental Carbon Company, Houston, TX (US)

( * ) Notice: Subject to any disclaimer, the term of this patent is extended or adjusted under 35 U.S.C. 154(b) by 576 days.

(21) Appl. No.: 11/404,142

(22) Filed: Apr. 13, 2006

(65) Prior Publication Data
US 2010/0119724 A1   May 13, 2010

Related U.S. Application Data

(60) Provisional application No. 60/671,001, filed on Apr. 13, 2005, now abandoned.

(51) Int. Cl.
C23C 4/10 (2006.01)
B05D 1/08 (2006.01)
B01J 19/08 (2006.01)
D01F 9/12 (2006.01)

(52) U.S. Cl. .............. 423/445 R; 423/447.1; 427/450; 427/446; 977/742; 977/750; 977/752; 977/843; 977/842

(58) Field of Classification Search .......... None
See application file for complete search history.

(56) References Cited

U.S. PATENT DOCUMENTS 7,157,066 B2 * 1/2007 Diener et al. ........... 423/445 B

2005/0207964 A1 * 9/2005 Kim et al. ............... 423/447.3
2006/0127299 A1 * 6/2006 Harbec et al. ........... 423/445 B

FOREIGN PATENT DOCUMENTS

WO   WO 03/095362 A2 * 11/2003

OTHER PUBLICATIONS

Lowe et al. Diamond Deposition in Low Pressure Acetylene Flames: In Situ Temperature and Species Concentration Measurements by Laser Diagnostics and Molecular Beam Mass Spectrometry; Combustion and Flame; 118, 37-50; 1999.*
Okuno et al. Catalyst Assisted Synthesis of Carbon Nanotubes Using the Oxy-Acetylene Combustion Flame Method; Journal of Carbon; 43, pp. 864-866; Dec. 2004.*
Merriam Webster definition of aerosol; 2009.*
Uhm et al.; A Microwave Plasma Torch and Its Applications; Plasma Sources Sci. Technol.; 15, S26-S34; 2006.*

(Continued)

Primary Examiner—Melvin C Mayes
Assistant Examiner—Guinever S Gregorio
(74) Attorney, Agent, or Firm—Winstead PC

(57) ABSTRACT

A method and apparatus for production of nanoscale materials is disclosed. In the preferred embodiments, the invention is scalable and tunable to reliably produce nanoscale materials of specifically desired qualities and at relatively high levels of purity. In a preferred embodiment, combustible gas is discharged onto a substrate through a multi-zone flame facilitating the formation of nanoscale materials such as single and multi-wall nanotubes.

3 Claims, 13 Drawing Sheets

OTHER PUBLICATIONS

Height et al.; Flame synthesis of Single-Walled Carbon Nanotubes; Carbon; 42, 2295-2307; 2004.*

Dobbins et al.; Morphology o Flame-Generated Soot As Determined by Thermophoretic Sampling; Langmuir; 1987, 3, 254-259.*

Srivastava et al.; Evaluation of Carbon Black Slurries as Clean Burning Fuels; Fuel, vol. 73, No. 12; 1994.*

Diener, et al., "Synthesis of Single-Walled Carbon Nanotubes in Flames", J. Phys. Chem. B, 104:2000, pp. 9615-9620.

Merchan-Merchan, et al., "High rate flame synthesis of vertically aligned carbon nanotubes using electric field control", 42:2004, pp. 599-608.

Johnson, et al., "A dynamic continuum of nanostructured carbons in the combustion furnace", Carbon, 40:2002, pp. 189-194.

Vander Wal, et al., "Comparative flame and furnace synthesis of single-walled carbon nanotubes", Chem. Phys. Lett., 336:2001, pp. 24-32.

Vander Wal, et al., "Diffusion flame synthesis of single-walled carbon nanotubes", Chem. Phys. Lett., 323:2000, pp. 217-223.

Vander Wal, et al., "Ferrocene as a Precursor Reagent for Metal-Catalyzed Carbon Nanotubes: Competing Effects", Comb. Flame, 130:2002, pp. 27-36.

Vander Wal, et al., "Flame Synthesis of Metal-Catalyzed Single-Wall Carbon Nanotubes", J. Phys. Chem. A, 104:2000, pp. 7209-7217.

Vander Wal, "Flame synthesis of Ni-catalyzed nanofibers", Carbon, 40:2002, pp. 2101-2107.

Vander Wal, et al., "Flame and Furnace Synthesis of Single-Walled and Multi-Walled Carbon Nanotubes and Nanofibers", J. Phys. Chem. B, 105:2001, pp. 10249-10256.

Vander Wal, et al., "Flame synthesis of Fe catalyzed single-wall carbon nanotubes and Ni catalyzed nanofibers: growth mechanisms and consequences", Chem. Phys. Lett., 349:2001, pp. 178-184.

* cited by examiner

Run #: NTB 128

Product: Single Wall Carbon Nanotubes
Tube Diameter: 1.8nm
Catalyst: Aerosolized ferrocene
Flame: Multi-zone single flame
Confirmation: SEM, Raman, TEM Run #: NTB 221

Product: SWNTs and MWNTS with carbon onions
Tube Diameter (ave): 2- 5nm
Catalyst: Aerosolized ferrocene
Flame: Multizone single flame
Confirmation: SEM, Raman, TEM Run #: NTB 251

Product: SWNTs
Tube Diameter (ave): 1.0nm
Catalyst: Aerosolized ferrocene
Flame: Multizone single flame
Confirmation: SEM, Raman, TEM Run #: NC NTB 12

Product: SWNTs
Tube Diameter: 25-45nm
Catalyst: Reclaimed carbon black
Flame: Multizone single flame
Confirmation: SEM, Raman, TEM

FIG. 10c TEM

SEM

Product: MW AND SWNTs
Tube Diameter: 5-35nm
Catalyst: Aerosolized Carbon Black
Flame: Multizone single flame
Confirmation: SEM, Raman, TEM

RUN #: NC NTB 10

Product: MWNTs
Tube Diameter: 5-85nm
Catalyst: Aerosolized Carbon Black
Flame: Multizone single flame
Confirmation: SEM, Raman, TEM

RUN #: NC NTB 271

Product: MWNTs
Tube Diameter: 5-85nm
Catalyst: None
Flame: Multizone single flame
Confirmation: SEM, Raman, TEM

RUN #: MM_5-1

RUN #: MM_4-2

Product: SW and MWNTs
Catalyst: Methane
Flame: Multizone single flame
Confirmation: SEM, Raman
MM4_4-2 Raman: 1600, 1319, 278, 226cm-1
MM_5-1 Raman: 1584, 1335, 288, 239, 225cm-1

Nano and Microdiamonds: [100] Orientation

Product: Nano and Microdiamonds
Tube Diameter: 10 to 100 μm; [100] orientation
Catalyst: None
Flame: Multizone single flame
Confirmation: SEM, Raman, Xray diffraction

Nano and Microdiamonds: [111] Orientation
FIG. 16b
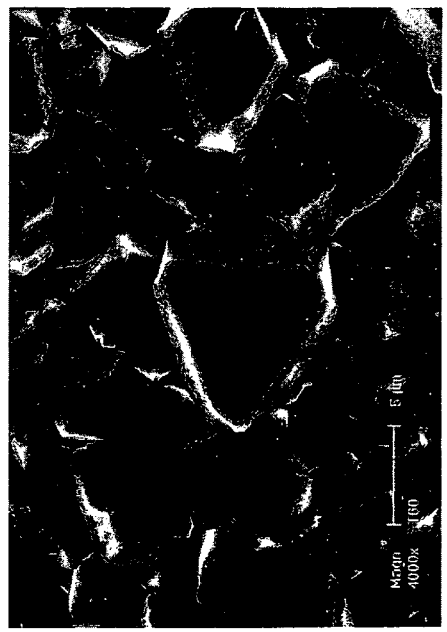
FIG. 16a
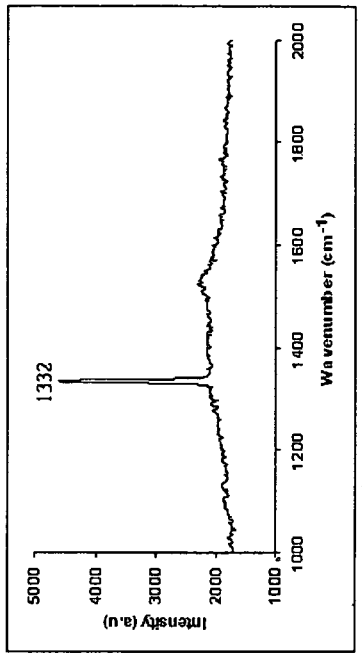
FIG. 16c  Raman
Product: Nano and Microdiamonds
Tube Diameter: 10 to 100 µm; [111] orientation
Catalyst: None
Flame: Multizone single flame
Confirmation: SEM, Raman, Xray diffraction

METHODS AND SYSTEMS FOR SYNTHESIS ON NANOSCALE MATERIALS

RELATED APPLICATION DATA

This application claims the priority of prior provisional U.S. patent application Ser. No. 60/671,001, filed on Apr. 13, 2005, which application is hereby incorporated by reference herein in its entirety.

FIELD OF THE INVENTION

The present invention relates nanoscale materials, and more particularly relates to methods and apparatuses for the flame synthesis of high purity carbon nanotubes and other novel nanoscale materials. The invention is believed to offer significant potential for manufacturing of carbon nanotubes and the like in large quantities at substantially lower cost than that of other methods currently available. This invention allows for the selective synthesis of single-wall (SWNTs) and/or multi-wall (MWNTs) nanotubes with specific dimensions and properties by controlling the catalyst size. Carbon onions and/or high purity nanodiamonds can also be produced. Further, the invention provides for continuous processing and commercial scalability based on integrating known practices in the carbon black industry.

BACKGROUND OF THE INVENTION

Carbon nanotubes are tubules of carbon generally having lengths from 5 to 100 micrometers and diameters from 5 to 100 nanometers. Carbon nanotubes may be formed as one SWNT (single-walled nanotubes) or several co-axial cylinders of graphite sheets MWNT (multi-walled nanotubes). Carbon nanotubes can function as either a metallic-like conductor or a semiconductor, according to the rolled shape and diameter of the helical tubes. (Ebbesen II; Iijima et al., "Helical Microtubules Of Graphitic Carbon," Nature, Vol. 354, (1991) 56).

Carbon nanotubes have many desirable physical, chemistry and electronic properties such as: a high mechanical strength (Young modulus+1 TPa) with low weight compared to volume (2.0 g/cm$^3$); high specific area (100-250 m$^2$/g); high aspect ratio and chemical stability; high thermal conductivities and excellent photoemission properties, among others.

Nanotubes comprised of, or doped with, other atoms are proving to have equally interesting physio and photo electronic properties. (J. Bai, et. al. "Metallic single-walled silicon nanotubes" in Publications of the National Academy of Sciences, 2004, 101(9), 2664-2668; D. F. Perepichka and F. Rosei "Silicon Nanotubes" in Small, (Wiley Press) 2006, 2(1), 22-25).

Currently, there are many emerging materials applications awaiting commercialization of such nanoscale materials. For example:

1. Composites

As conductive filler in polymers, CNTs are quite effective compared to traditional carbon black micro-particles, primarily due to their large aspect ratios (Colbert D T. "Single-wall nanotubes: a new option for conductive plastics and engineering polymers." Plastics Additives Compounds, 2003, 18-25).

CNTs may also be used in composites for thermal management (Biercuk M J, Llagumo M C, Radosvljevic M, Hyun J K, Johnson AT. "Carbon nanotubes composites for thermal management." Appl. Phys. Lett 2002, 80, 15.).

CNTs may be used as reinforcement for polymer matrices or rubber matrix (Meincke O, Kaempfer D, Weickmann H, Friedrich C, Vathauer M, Warth H. "Mechanical properties and electrical conductivity of carbon-nanotube filled polyamide-6 and its blends with acrylonitrile/butadiene/styrene." Polymer 45, 2004, 739-748)/(Frogley M D, Ravich D, Wagner H D. "Mechanical properties of carbon nanoparticle-reinforced elastomers." (Composites Science and Technology 63, 2003, 1647-1654).

CNTs may be dispersed into matrices of conjugated polymers, such as poly(phenylenevinylene) and derivatives, to prepare composites of interesting optoelectronic properties. (Dalton A B, Stephan C, Coleman J N, McCarthy B, Ajayan P M, Lefrant S, Bernier P, Blau W J, Byrne H J. Journal Phys. Chem. B 104, 2000, 10012).

2. Field Emission

Both B- and N-doped CNTs may have great potentials as building blocks for stable and intense field-emission sources. Electrons can be easily emitted from CNT tips when a potential is applied between the CNT's surface and an anode. N-doped MWNTs are able to emit electrons at relatively low turn-on voltages (2 V/μm) and high current densities (0.2-0.4 A/cm2) and shown excellent field emission properties at 800 K.

Their size with high aspect ratios and small tip radius of curvature leads to possible use as electron emitters for flat panel displays and AFM/STM probes. (Q. H. Wang, A. A. Setlur, J. M. Lauerhaas, J. Y. Dai, E. W. Seelig, and R. P. H. Chang, Appl. Phys. Lett. 72, 1998, 2912) and (H. Dai, J. H. Hafner, A. G. Rinzler, D. T. Colbert, and R. E. Smalley, Nature 384, 1996, 147).

3. Sensors

Pure carbon SWNTs and MWNTs can be used to detect toxic gases and other species, because small concentrations are capable of producing large shifts in the nanotube conductance, shifting the Fermi level to the valence band, and generating hole-enhanced conductance. $CN_x$ MWNTs display a fast response on the order of milliseconds when exposed to toxic gases and organic solvents and reach saturation within 2-3 seconds.

4. Alternative Energy Storage Devices

A particularly interesting property of carbon nanotubes is that their widths are just large enough to accept hydrogen molecules but too small for larger molecules. As a result, carbon nanotubes have drawn a great deal of attention as storage vehicles for hydrogen and, consequently, for use in fuel cell applications.

Although carbon nanotubes have many advantageous properties, successful commercial applications of them have not yet been reported due to the difficulty in synthesis capacity, manipulation and structural controllability of the carbon nanotubes. Therefore, there is a need for a method and apparatus which enables the synthesis of uniform high purity carbon nanotubes and other nanoscale materials in a cost effective and easily controllable method.

Synthesis of Carbon Nanotubes

1. Catalytic Disproportionation of Carbon Monoxide

Carbon nanotube synthesis was reported in the 1970's and 80's using the catalytic disproportionation of carbon monoxide and/or hydrocarbons. (R. J. K. Baker, et. al "Formation of Filamentous carbon from iron, cobalt and chromium catalysed decomposition of acetylene" Journal of Catalysis, 1973, (30), 86-95.) The resulting nanotubes were well-characterized as such by high resolution transmission electron microscopy and x-ray diffraction spectroscopy. (M. Audier, A. Oberlin, M. Oberlin, M. Coulon, and L. Bonnetain in Carbon, 1981, (19), 217-224). However, the work by early researchers was not to be fully understood in the current concept of so-called 'carbon nanotubes' until the discovery of Buckminster fullerene (C60), a new allotrope of carbon in 1988, followed by Iijma's report in 1991 of the 'discovery' of carbon nanotubes, another 'new' allotrope of carbon.

Later work by Smalley et. al in the 1990's used the dispropotionation of carbon monoxide under high pressures with metal catalysts. Known as the "HiPCO" process, it was one of the first attempts at production of SWNTs on a batch scale level.

2. Arc Discharge Techniques

Those of ordinary skill in the art will appreciate that carbon tubules can be prepared (with some degree of efficiency and quality, at least) using standard arc-discharge techniques. Generally, the discharge is in a reaction vessel through which an inert gas flows at a controlled pressure. The potential, either direct current (DC) or alternating current (AC), is applied between two graphite electrodes in the vessel. As the electrodes are brought closer together, a discharge appears resulting in plasma formation. As the anode is consumed, a carbonaceous deposit forms on the cathode, a deposit that under the proper conditions contains the desired carbon nanotubes. Carbon nanotubes produced by an arc discharge between two graphite rods were reported in an article entitled: "Helical Microtubules of Graphitic Carbon" (Nature, Vol. 354, Nov. 7, 1991, pp. 56-58) by Sumio Iijima.

This technique is commonly used to produce carbon nanotubes, however, yield of pure carbon nanotubes with respect to the end product is regarded by some as less than optimal, i.e., only about 15%. Thus, a complicated purification process must be carried out for particular device applications. (J. Kong, A. M. Cassell, and H Dai, in Chem. Phys. Lett. 292, 567 (1988)).

A variation of this general synthetic procedure is reflected in U.S. Pat. No. 5,482,601, wherein carbon nanotubes are produced by successively repositioning an axially extending a graphite anode relative to a cathode surface, while impressing a direct current voltage there between, so that an arc discharge occurs with the simultaneous formation of carbon nanotubes as part of carbonaceous deposits on the various portions of the cathode surface. The deposits are then scraped to collect the nanotubes. The anode must be repositioned respective to the cathode, repeatedly, to provide larger quantities of the desired nanotube product.

However, conventional methods of making multi-walled nanotubes via arc discharge do not easily lend themselves to large scale production. (D. T. Colbert, J. Zhang, S. M. McClure, P. Nikolaev, Z. Chen, J. H. Hafner, D. W. Owens, P. G. Kotula, C. B. Carter, J. H. Weaver, A. G. Rinzler, and R. E. Smalley, Science 266, 1218 (1994)).

2. Laser Ablation Techniques

The laser vaporization method, which had been originally used as a source of clusters and ultrafine particles, was developed for fullerene and CNTs production by a group led by Richard E. Smalley. (A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanet, J. E. Fischer, and R. E. Smalley in Science, 273, 483 (1996)).

CNTs were grown by laser ablation of graphite composite targets at different temperatures under argon flow. Ni and Co have been used as one of the catalytic materials for formation of SWNTs during laser ablation. The target was fixed inside a quartz tube, which was fitted in an electric furnace. The tube was first evacuated by a rotary pump, and then flowing argon gas was introduced in it. The pressure of argon gas inside the tube was maintained at 500 Torr. The target and the growth zone were heated by an electric furnace. The method has several advantages, such as high-quality SWNT production, diameter control, investigation of growth dynamics. (J. Hafner, M. Bronikowski, B. Azamian, P. Nikoleav, D. Colbert, K. Smith, and R. Smalley, in Chem. Phys Lett. 296, 195 (1998); R. Sen, S. Suzuki, H. Kataura, Y. Achiba. Chemical Physic Letters 346, 2001, 383.)

3. Plasma-Assisted Chemical Vapor Deposition (CVD)

Radio frequency (RF) plasma or microwave plasma-enhanced chemical vapor deposition techniques have been used to synthesize large areas of aligned MWNTs. In general, the apparatus of these techniques consists of a quartz tube, a furnace for heating a substrate, a waveguide, and a pumping system. These techniques work at base pressure ($10^{-2}$ Torr). The substrate is placed in the quartz tube heated in the furnace. This technique using Fe and/or Ni as transition metal catalysts dispersed on silica substrates. Acetylene or $CH_4$ and $N_2$ or $NH_3$ may be used as the source gases.

The flexibility of CVD systems allows for contamination-free processing and a modification of plasma shape through tuning of the cavity, allows synthesis of a wide variety of carbon allotropes.

The CVD method is apparently useful for nanotube electronic device synthesis and integration into more conventional electronic architecture, the supported catalyst imposes severe limitations on the scale and CNTs growth rate.

4. Thermal Chemical Vapor Deposition (CVD)

CVD is another popular method for producing CNTs in which a hydrocarbon vapor is thermally decomposed in the presence of a metal catalyst. The process involves passing a hydrocarbon vapor (typically for 15-60 min) through a tube furnace in which a catalyst material is present at sufficiently high temperature (600-1200° C.) to decompose the hydrocarbon. CNTs grow over the catalyst and are collected upon cooling the system to room temperature. The catalyst materials may be solid, liquid or gas and can be placed inside the furnace or fed in from outside.

High quality individual single-walled carbon nanotubes (SWNTS) have been produced via the thermal chemical vapor deposition (CVD) approach, using Fe/Mo or Fe nanoparticles as a catalyst.

The CVD process has allowed selective growth of individual SWNTs, and simplified the process for making SWNT-based devices. CVD growth of SWNTs at temperatures of 900° C. and above was described using Fe or an Fe/Mo bi-layer thin film supported with a thin aluminium under layer. However, the required high growth temperature prevents integration of CNTs growth with other device fabrication processes.

Related technology is described in U.S. Pat. No. 5,877,110 whereby carbon fibrils are prepared by contacting a metal catalyst with a carbon-containing gas. The fibrils can be prepared continuously by bringing the reactor to reaction temperature, adding metal catalyst particles, then continuously contacting the catalyst with a carbon-containing gas. Various complexities relating to feed rates, competing side reactions and product purity, among others, tend to detract from the wide-spread applicability and acceptance of this approach.

5. Flame Chemical Vapor Deposition (CVD)

Flames offer potential for synthesis of carbon nanotubes in large quantities at significantly lower cost than that of other methods currently available. By this technique, it has been shown in the art that a premixed flame configuration operated at low pressure (20-97 Torr), and burner gas velocity between 25 and 50 cm/s can be used. A variety of fuels and fuel/oxygen compositions (C/O ratios) have been explored, including acetylene, benzene (C/O 0.86-1.00) and ethylene (C/O 1.07) and diluent concentrations between 0% and 44 mol. These flames are all considered 'sooting' flames as they spontaneously generate condensed carbon in the form of soot agglomerates suspended in the flame gases. Similarly, it has been reported that nanotubes may be produced in flames under sooting conditions. Samples of condensed material can be obtained directly from the flame using a water-cooled gas extraction probe and also from the water-cooled surfaces of the burner chamber. Nanostructures have also been extracted from the collected soot material by sonication of soot material dispersed in toluene.

In 2000, the synthesis of single-walled carbon nanotubes in sooting flames at subambient pressures was reported. A partially-mixed flame configuration was used with fuel gases (acetylene, ethylene or benzene) issued through numerous small diameter tubes distributed through a sintered-metal plate through which oxygen flows, drafting past the fuel tubes. Iron and nickel compounds were vaporized and included in the flame feed as a metal catalyst precursor. Single-walled nanotubes were observed in acetylene and ethylene flames while multi-walled nanotubes were observed in benzene flames.

It is widely agreed among those in the field that the more pressing issues for CNT technology relate to the availability, cost, and purity of CNTs. Currently, laser, arc, and chemical vapor deposition preparation techniques have the crucial role of supplying researchers with the material necessary for characterization of CNTs' properties and predicting CNTs' applications. However, for industrial applications (in energy storage or material reinforcement, for example) to become a practical and commercially-viable reality, a process which can produce very large quantities of quality CNTs will be required.

Those of ordinary skill in the art will be aware of certain flame processes that are frequently used in commercial manufacture due to their many desirable features, including continuous processing (i.e., volume production and scalability), energy efficiency, and capability of synthesizing and processing heterogeneous materials. The present invention seeks to apply and further develop prior art techniques in commercial flame technologies (e.g. the carbon black industry) into a unique process for the manufacture of nanoscale materials. (See, e.g., U.S. Pat. No. 4,988,493 to Norman et al, and assigned to the assignee of the present invention.)

By using well defined, well-controlled multiple zone flames, the present invention in one aspect achieves a breakthrough in the ability to manufacture commercial volumes of uniform high quality carbon nanotubes and other nanomaterials. This is believed to be a significant improvement over early research using a commercial carbon black furnace to produce carbon nanomaterials. (See, e.g., J. B Donnet et. al, "Carbon Black and Fullerenes Part II: Precursor and Structure Identification" in Kautschuk Gummi Kunststoffe, 1999, 340-343; M Pontier Johnson, et. al. "A Dynamic Continuum of Nanostructured Carbons in the Combustion Furnace" Carbon, 2002, 189-194.

SUMMARY OF THE INVENTION

In view of the foregoing and other considerations which will be readily appreciated by those of ordinary skill in the art, the present invention is directed in one aspect to an apparatus and associated methods for synthesizing nanoscale materials, including carbon nanotubes.

In one embodiment, the invention involves propulsion of a combustible (e.g., hydrocarbon) gas through a torch nozzle to produce a flame. The nozzle is positioned a selectable distance above a cooled substrate, upon which nanoscale materials, such as single-wall nanotubes, multi-wall nanotubes, "nano onions" (concentric spheres), and nano-diamonds are deposited.

In one embodiment, the flame is quenched and formation reactions terminated by introducing a coolant in to the flame at a predetermined reaction time, with the product collected by filtration from the resulting gaseous stream.

Notably, and in accordance with one embodiment of the invention, the flame may comprise multiple concentric or layered zones controlled independently by differing mixtures of gases, each tailored to a specific contribution to the process.

In one embodiment, the combustible gas is a mixture of oxygen ($O_2$) and acetylene ($C_2H_2$) in a predetermined and selectable ratio.

In another embodiment, a colloidal carbon material in the form of spheres and of their fused aggregates, with sizes below 1000 nm, a material more commonly referred to as carbon black, is introduced into the flame. An advantage of this embodiment is that the final products are free of non-carbon catalyst residues, thus eliminating the need for complex purification steps. Further, the carbon black provides feedstock for formation of the carbon nanostructures, functions as a solid state 'catalyst' prior to being consumed by the nanotube formation, and can be used as a "template" for nanotubes of specific dimensions.

In another embodiment, other solid state catalysts can be used to synthesize novel types of nanotubes and nanoscale materials, as will be hereinafter described in further detail.

In accordance with one aspect of the invention, the synthesis process may or may not involve introduction of a catalyst into an oxyacetylene flame. One preferred catalyst is ferrocene ($Fe(C_5H_5)_2$), although it is contemplated that many other catalyst materials may be employed. In a presently preferred embodiment, the catalyst is introduced into the flame by a carrier gas, such as argon.

In accordance with still another aspect of the invention, the synthesis process is highly tunable. Advantageously, numerous process parameters can be controlled, such that various distinct species of end product can be produced from a single reactor. Such process parameters include, without limitation: the catalyst (if any) used; the grade of carbon black (if any) used; the mixture ratio of hydrocarbon gas used to feed the flame; the flow rate of gases through the torch nozzle; the distance from the flame tip to the substrate; the composition of the substrate; the controlled temperature of the substrate; the deposition time; and others.

As a consequence of the many controllable process parameters, the same reactor can be used to produce numerous different types of nanoscale materials with differing properties including single-wall nanotubes, multi-wall nanotubes, nano-onions, and nano-diamonds. Empirical data shows that through careful control of process parameters, exceptionally high consistency and purity in the final products can be achieved.

BRIEF DESCRIPTION OF THE DRAWINGS

Various features and aspects of the invention will be best appreciated by reference to a detailed description of preferred embodiments thereof, when read in conjunction with the accompanying drawings, wherein:

FIG. 7b is a plot of the Raman spectrum of the material depicted in FIG. 7a;

FIG. 8a is a TEM image of SWNTs produced in accordance with one embodiment of the present invention; FIG. 8b is a plot of the Raman spectrum of the material depicted in FIG. 8a;

FIGS. 11a and 11b are SEM and TEM images, respectively, of multiwall nanotubes produced in accordance with one embodiment of the invention.

FIG. 12b is a plot of the Raman spectrum of the material depicted in FIG. 12a;

FIGS. 16a and 16b are SEM images of nano and micro diamonds produced in accordance with one embodiment of the invention; FIG. 16c is a plot of the Raman spectrum of the material depicted in FIGS. 16a and 16b.

DETAILED DESCRIPTION OF PREFERRED EMBODIMENTS OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such a development effort might be complex and time-consuming, but would, nevertheless, be a routine undertaking for those of ordinary skill in the relevant fields.

Figure 1:
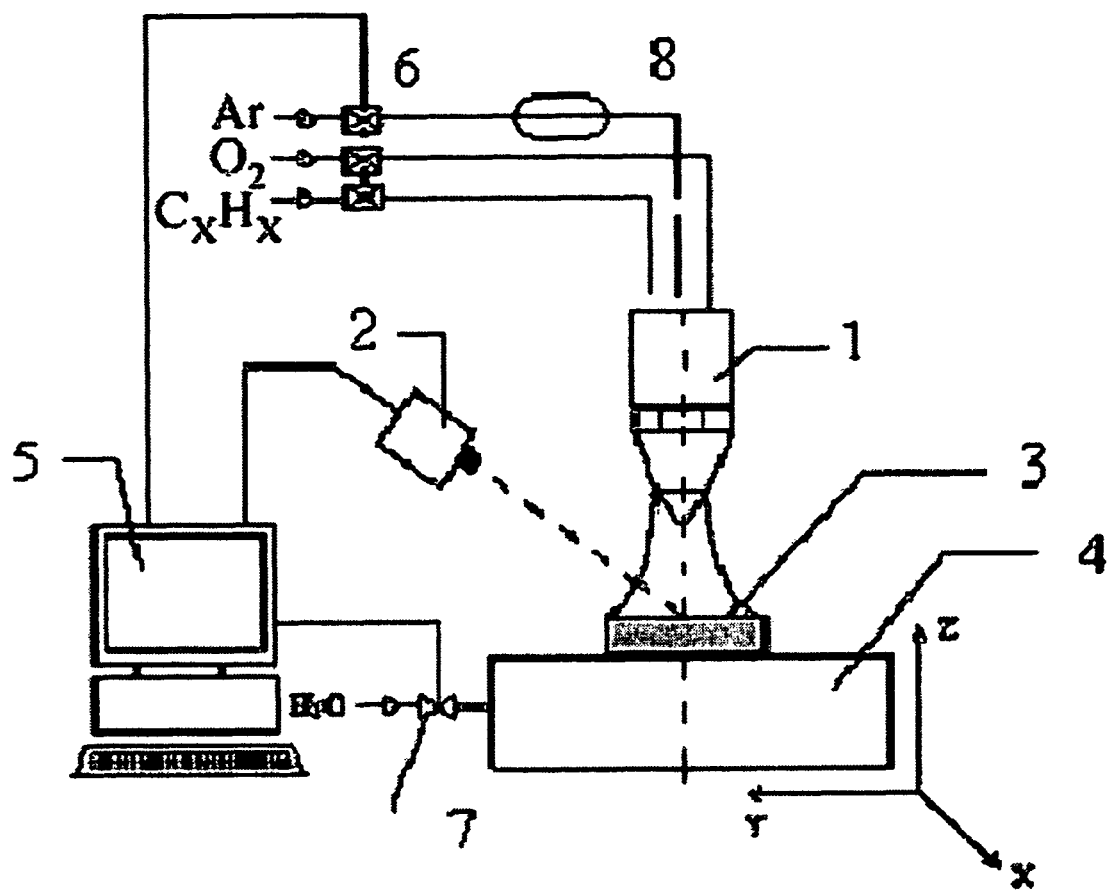
FIG. 1 is a schematic diagram of a reactor system for synthesis of nanoscale materials in accordance with one embodiment of the invention.

FIG. 1 is a schematic diagram of an apparatus for synthesizing nanoscale materials in accordance with one embodiment of the invention. The apparatus of FIG. 1 includes a torch nozzle 1, a substrate 3, a water-cooled holder 4, a mass flow meter 6, a water valve 7, a catalyst 8, and a pyrometer 2. Various components of the system are controlled by means of a computer 5.

A premixed acetylene/oxygen flame burner in ambient atmosphere forms the basis of the invention. All gas flow rates are regulated by mass flow controllers. In accordance with one aspect of the invention, the high temperature of oxyacetylene flames, about 3000° C., ionizes the hydrocarbon gas by thermal plasma, thus generating the chemical vapor species. A multiple concentric or layered flame with each zone controlled separately by varying gas mixtures results in the synthesis of specific nanotubes and other nanoscale materials.

The ratio of acetylene, or other hydrocarbon, to oxygen is believed to be important for optimizing conditions for synthesis and deposition of carbon nanotubes, diamonds or other nanoscale materials, and is preferably maintained hydrocarbon rich. Other hydrocarbons have been successfully utilized as feedstocks, with the advantage of improved production economics.

Nanotube formation in a flame is promoted by injection of solid particles or metallic ions. Ferrocene or nickelocene may be used as the source of metal necessary for nanotube synthesis with the vapor supplied to the premixed feed gases via a temperature controller. In accordance with one aspect of the invention, carbon black particles have also been used successfully to promote nanotube formation, either as ball-milled pellets or as particles formed in situ in a separate zone of the flame.

In one embodiment, argon may be used as carrier gas for the solid catalyst, and to control the quantity of catalyst entering the flame. The deposition temperature is preferably measured and controlled using an infrared pyrometer under control of the computer 5.

The distance between the torch nozzle and the substrate, which along with flow rates control reaction time prior to deposition, is carefully controlled. The deposition times are also carefully controlled.

Figure 2:
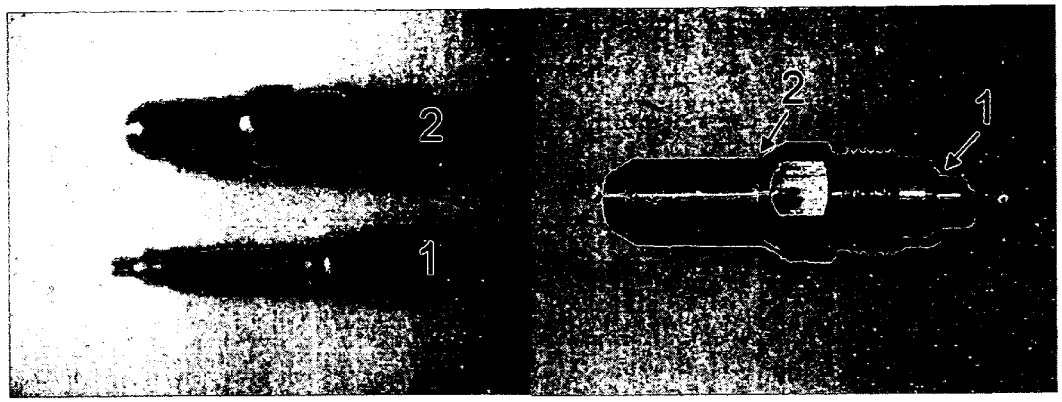
FIG. 2 is a side view of a torch nozzle used in the reactor system of FIG. 1.
Figure 3:
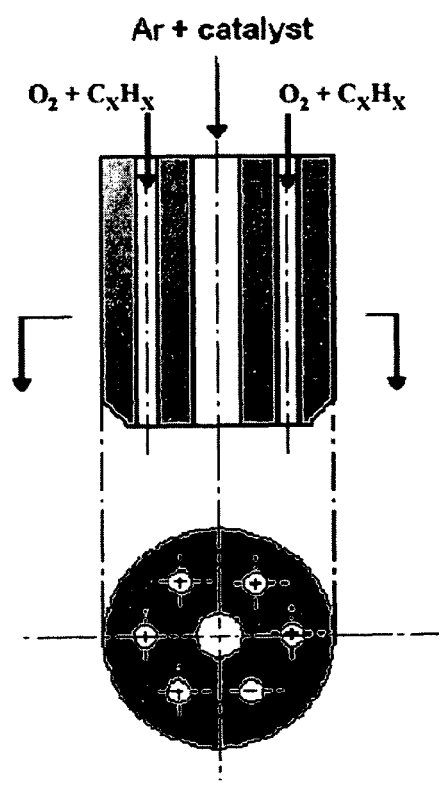
FIG. 3 is a side and end cross-sectional view of the torch nozzle from FIG. 2.
Figure 4:
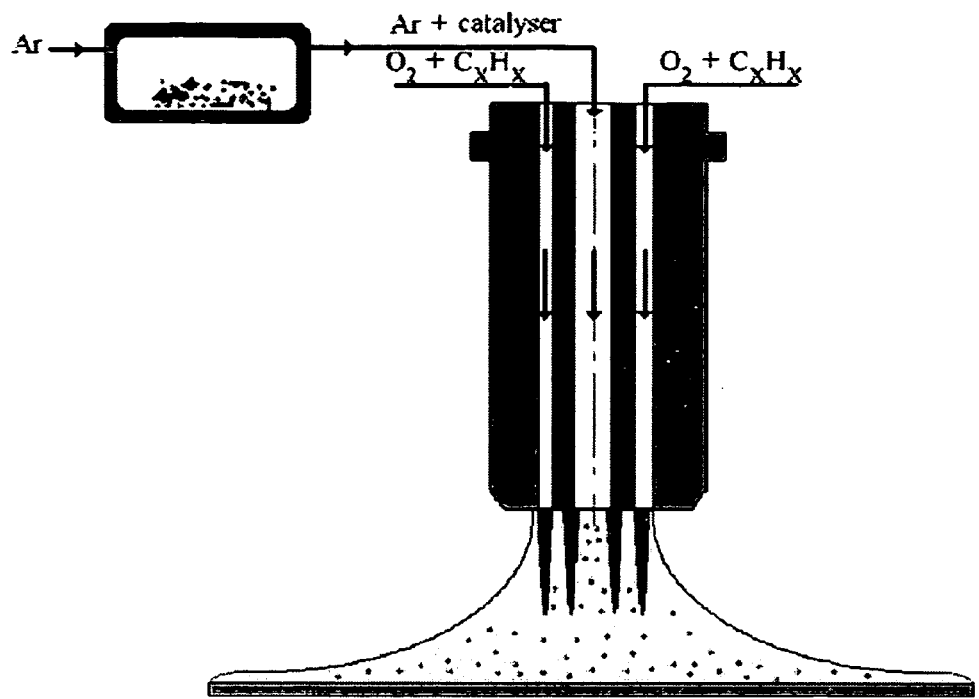
FIG. 4 is a side cross-sectional view of the torch nozzle from FIGS. 2 and 3 while operating to synthesize nanoscale materials.
Figure 5:
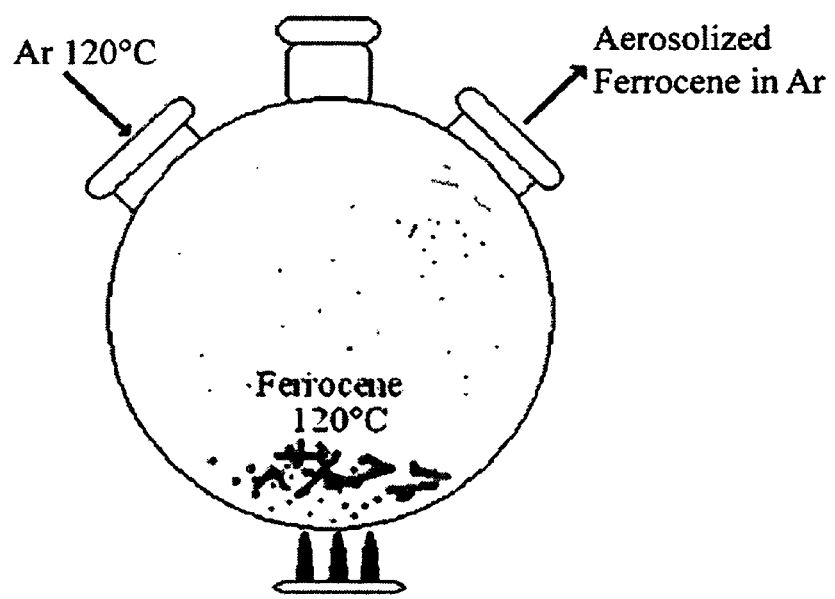
FIG. 5 is a schematic representation of a vessel for containing catalyst material and for introducing catalyst material into a carrier stream.

FIGS. 2 and 3 show a torch nozzle 1 in accordance with one embodiment of the invention. In an exemplary embodiment, which is by no means limiting with respect to the overall scope of the invention, the torch nozzle 1 consists of a 10 mm diameter copper tube with six uniformly spaced, 0.3 mm diameter holes at the tip surrounding one central orifice of 2 mm diameter. The torch is preferably attached to an x-y-z translation system for positioning the torch nozzle 1 relative to the substrate.

EXAMPLES

Example 1

The torch is moved vertically by the manipulator and the substrate is moved horizontally by the substrate holder. Acetylene was supplied at a supply rate of 1 l/min and oxygen gas was supplied at a supply rate of 1.2 l/min. The substrate surface was maintained at a temperature of 500° C. This condition was continued for one minute to thus produce a carbon nanotubes on the substrate.

The product formed on the substrate was examined by Raman spectroscopy, Scanning Electron Microscopy (SEM) and by Transmission Electron Microscopy (TEM). Those of ordinary skill in the art will appreciate that the Raman spectra of carbon nanotubes have several distinctive peaks located between 0 and 3000 cm$^{-1}$. The first major peak occurs at about 1353 cm$^{-1}$ and the second occurs at 1583 cm$^{-1}$, and they are referred to as the D peak and the G peak, respectively. The G peak is the only first-order Raman peak observed in the spectrum of highly ordered pyrolytic graphite (HOPG). However, a modest amount of lattice disorder and clustering of carbon particles within the carbon structure gives rise to the D peak or the disorder-induced peak. The intensity of the D peak ($I_D$) and the G peak ($I_G$) are defined as the height of the peaks, and they can be measured in the Raman spectra. The Raman peaks located between 0 and 3000 cm$^{-1}$ are referred to as the first-order Raman spectrum of carbon nanotubes. Beside the D and G peaks, there are several smaller peaks occurring at 218 and 398 cm$^{-1}$. These Raman peaks are characteristic features arising from the $A_{1g}$ breathing mode of single-wall carbon nanotubes with diameter range 0.7-1.5 nm. This observation suggests that a quantity of single-wall nanotubes may have been deposited by this technique.

Examples

Extensive laboratory experimentation, refinement, and validation of the efficacy and utility of the present invention have been conducted. The following summarizes exemplary results of such experimental activity.

Figure 6B:
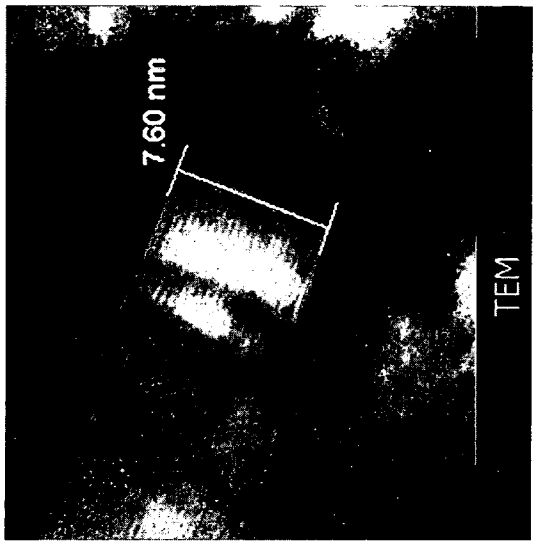
FIGS. 6a and 6b are scanning electron microscope (SEM) and tunneling electron microscope images, respectively, of single wall carbon nanotubes produced in accordance with one embodiment of the present invention.
Figure 6C:
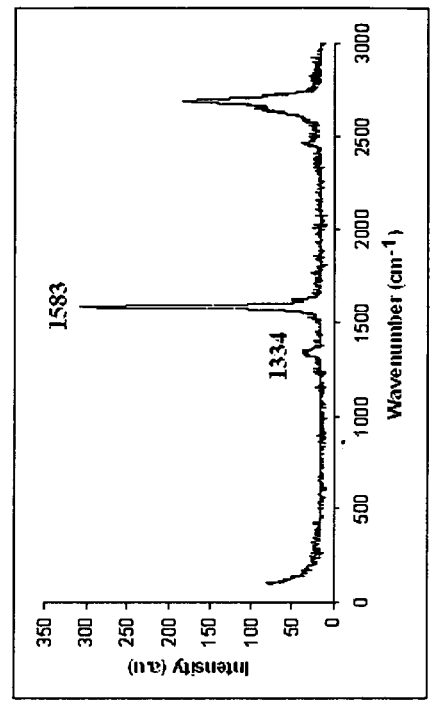
FIG. 6c is a plot of the Raman spectrum of the materials depicted in FIGS. 6a and 6b.
Figure 6A:
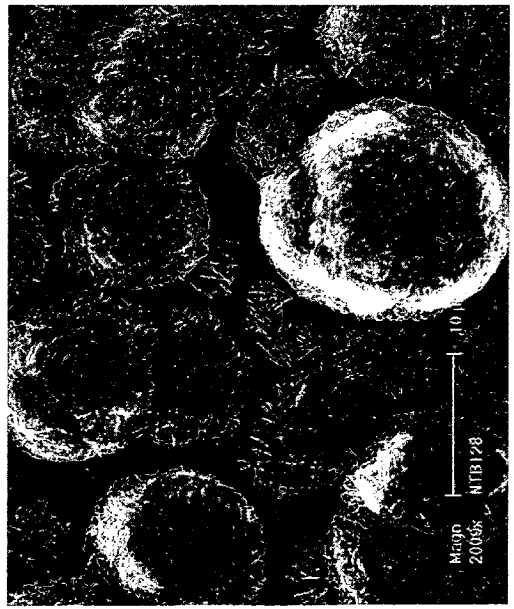

In particular, FIGS. 6a and 6b are scanning electron microscope (SEM) and tunneling electron microscope images, respectively, of single wall carbon nanotubes produced in accordance with one embodiment of the present invention; FIG. 6c is a plot of the Raman spectrum of the materials depicted in FIGS. 6a and 6b. In this example, the SWNTs were produced with a diameter of 1.8 nM, as can be observed in FIG. 6b, using aerosolized ferrocene as a catalyst in a multi-zone, single flame. The peak observable in FIG. 6c evidences a high degree of purity of SWNTs in the material produced in accordance with the invention under the specified conditions.

Figure 7B:
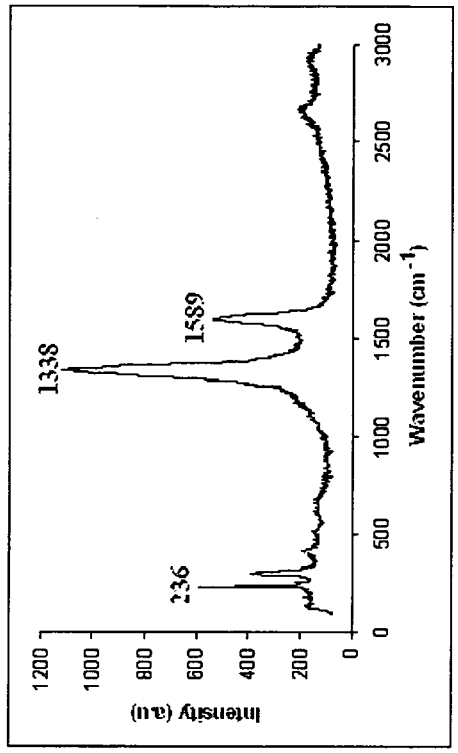
Figure 7A:
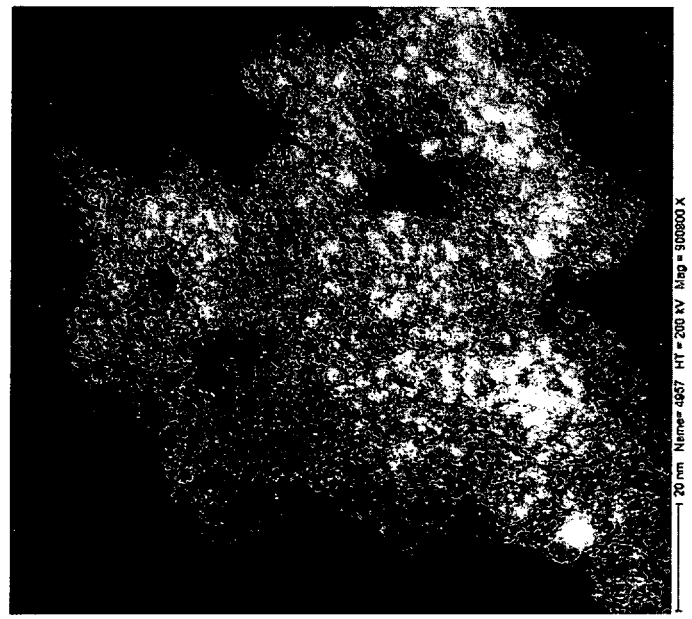
FIG. 7a is a TEM image of SWNTs and MWNTs with carbon onions produced in accordance with one embodiment of the invention.

FIG. 7a is a TEM image of SWNTs and MWNTs with carbon onions produced in accordance with one embodiment of the invention; FIG. 7b is a plot of the Raman spectrum of the material depicted in FIG. 7a. In this example, the SWNTs and MWNTs have an average diameter of 2-5 nM, and were produced using aerosolized ferrocene as a catalyst in a multizone single flame. The peaks observable in FIG. 7c evidence the consistent presence of SWNTs, MWNTs, and carbon onions in the material produced in accordance with the invention under the specified conditions.

Figures 8A, 8B:
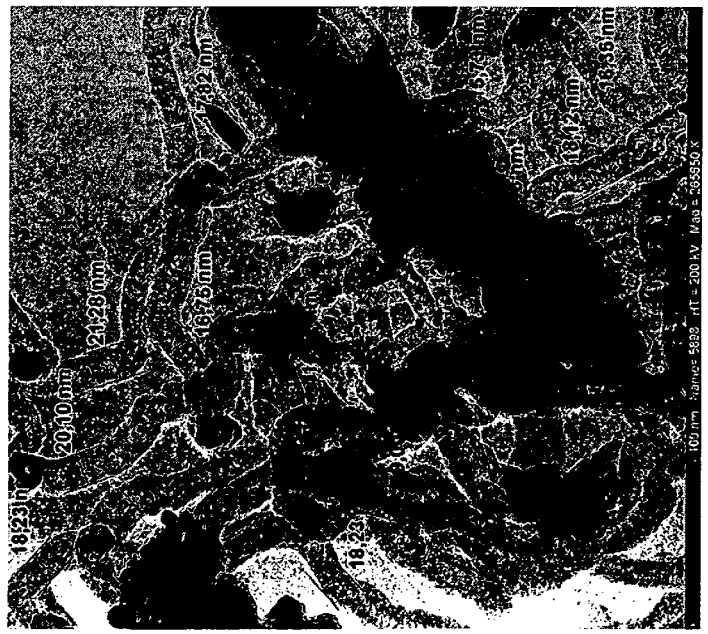

FIG. 8a is a TEM image of SWNTs produced in accordance with one embodiment of the present invention; FIG. 8b is a plot of the Raman spectrum of the material depicted in FIG. 8a. In this example, the resultant SWNTs have an average diameter of 1.0 nM and were produced using aerosolized ferrocene as a catalyst in a multizone single flame. The peaks observable in FIG. 8b evidence a high degree of purity of SWNTs in the material produced in accordance with the invention under the specified conditions.

Figure 9B:
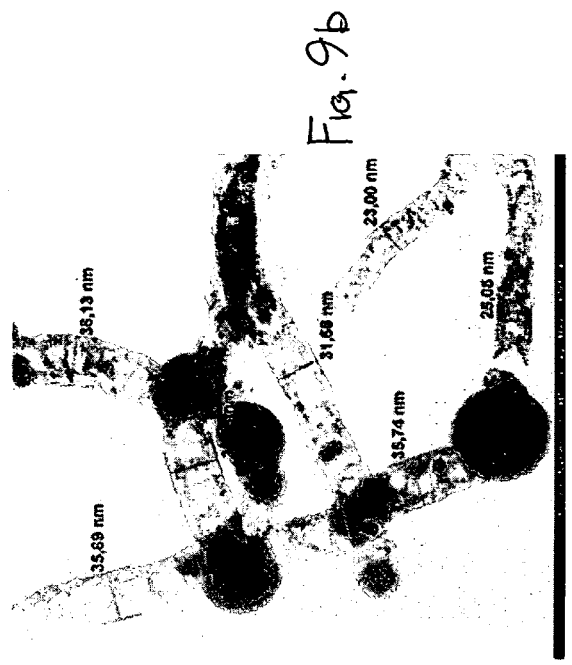
FIGS. 9a and 9b are SEM and TEM images of SWNTs produced in accordance with one embodiment of the present invention.
Figure 9C:
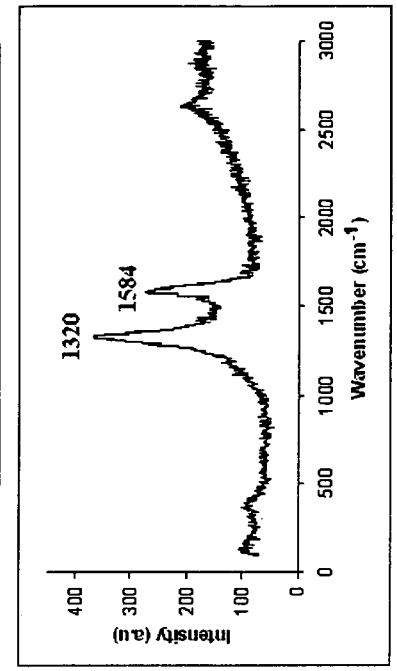
FIG. 9c is a plot of the Raman spectrum of the material depicted in FIGS. 9a and 9b.
Figure 9A:
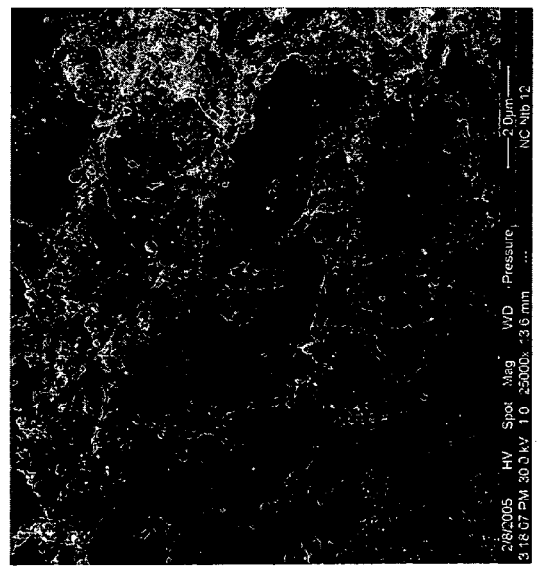
Figure 10B:
FIG. 10 is an SEM image.
FIG. 10d is a plot of the Raman spectrum of the material depicted in FIGS. 10a through 10c.
Figure 10D:
Figure 10D:
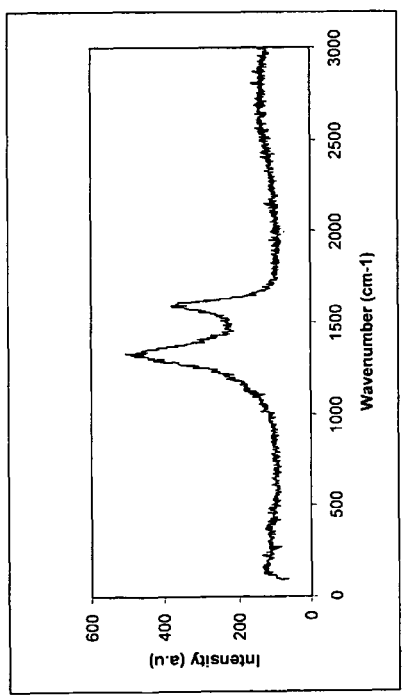
Figure 10A:
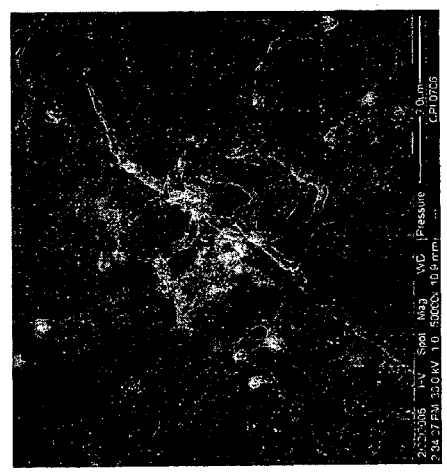

FIGS. 9a and 9b are SEM and TEM images of SWNTs produced in accordance with one embodiment of the present invention; FIG. 9c is a plot of the Raman spectrum of the material depicted in FIGS. 9a and 9b. In this example, the resultant SWNTs have an average diameter of 25-45 nM and wre produced using reclaimed carbon black as a catalyst in a multizone single flame.

Figure 11B:
FIGS. 11a and 11b are TEM images of multi-wall and single-wall nanotubes produced in accordance with one embodiment of the invention.
Figure 11C:
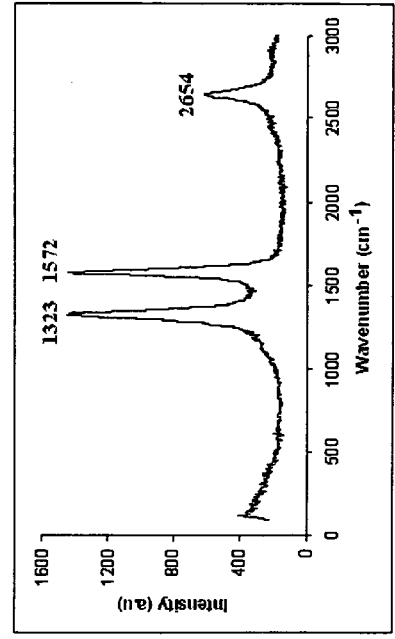
FIG. 11c is a plot of the Raman spectrum of the material depicted in FIGS. 11a and 11b.
Figure 11A:
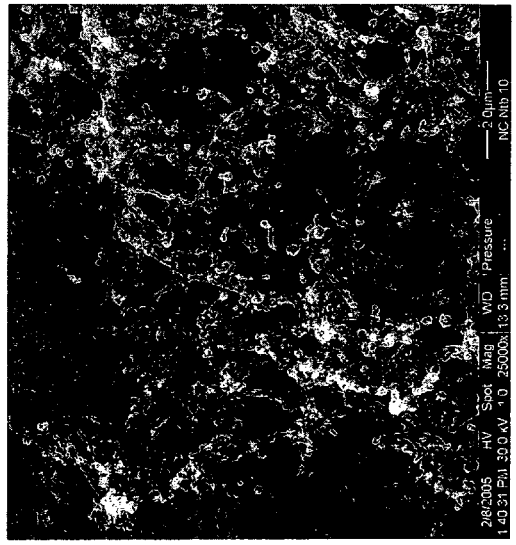

FIG. 10 is an SEM image, and FIGS. 11a and 11b are TEM images of multi-wall and single-wall nanotubes produced in accordance with one embodiment of the invention; FIG. 10d is a plot of the Raman spectrum of the material depicted in FIGS. 10a through 10c. In this example, MWNTs and SWNTs with an average diameter of 5 to 35 nM were produced using aerosolized carbon black as a catalyst in a multizone, single flame.

FIGS. 11a and 11b are SEM and TEM images, respectively, of multiwall nanotubes produced in accordance with one embodiment of the invention; FIG. 11c is a plot of the Raman spectrum of the material depicted in FIGS. 11a and 11b. In this example, the MWNTs have an average diameter of 5 to 85 nM and were produced using aerosolized carbon black as a catalyst in a multizone single flame.

Figure 12B:
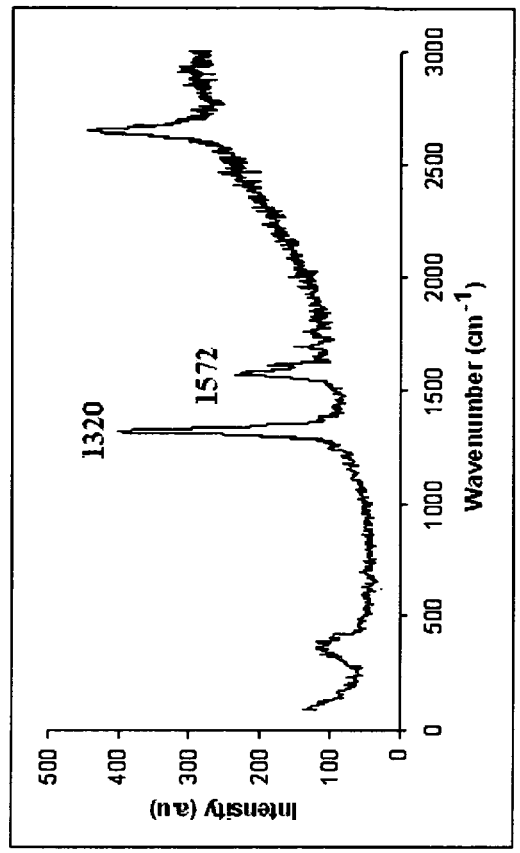
Figure 12A:
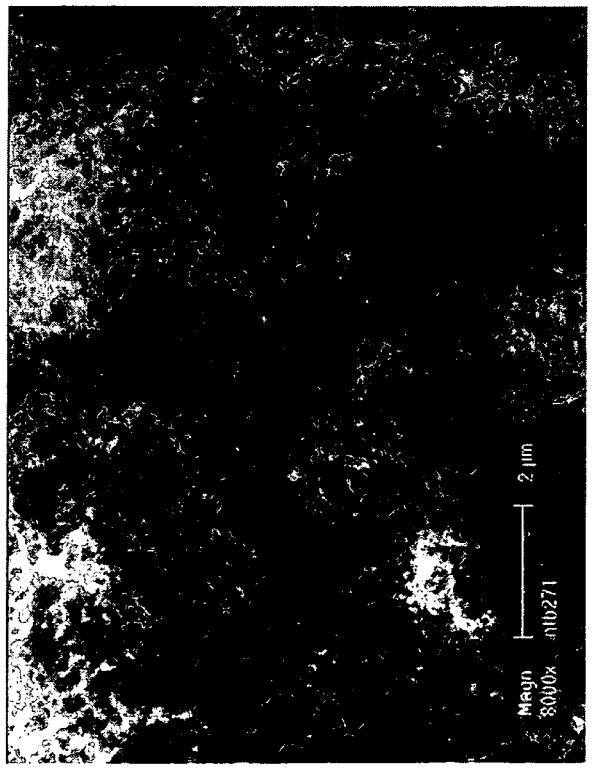
FIG. 12a is an SEM image of MWNTs produced in accordance with one embodiment of the invention.

FIG. 12a is an SEM image of MWNTs produced in accordance with one embodiment of the invention; FIG. 12b is a plot of the Raman spectrum of the material depicted in FIG. 12a. In this example, the MWNTs have an average diameter of 5 to 85 nM and were produced without the addition of a catalyst in a multizone single flame.

Figure 13:
FIG. 13 is a TEM image of SWNTs produced in accordance with one embodiment of the invention.

FIG. 13 is a TEM image of SWNTs produced in accordance with one embodiment of the invention. In this example, the SWNTs were produced using a methane-based catalyst in a multizone single flame. Raman spectroscopic analysis shows peaks at 1600, 1319, 278, and 226 cm$^{-1}$, evidencing the purity of the material produced.

Figure 14:
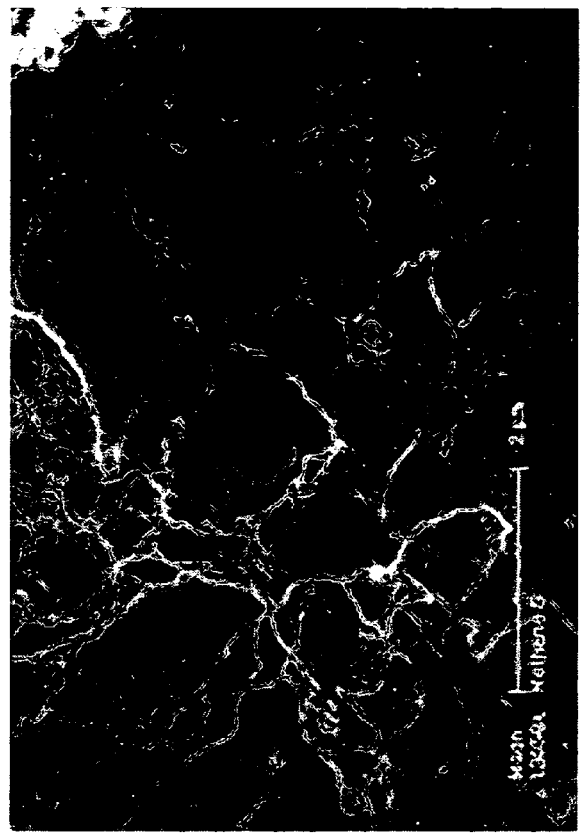
FIG. 14 is an SEM image of MWNTs produced in accordance with one embodiment of the invention.

FIG. 14 is an SEM image of MWNTs produced in accordance with one embodiment of the invention; In this example, the MWNTs were produced using a methane-based catalyst in a multizone single flame. Raman spectroscopic analysis shows peaks at 1584, 1335, 288, 239, and 225 cm$^{-1}$, evidencing the purity of the material produced.

Figure 15B:
FIGS. 15a and 15b are SEM images of nano and micro diamonds produced in accordance with one embodiment of the invention.
Figure 15C:
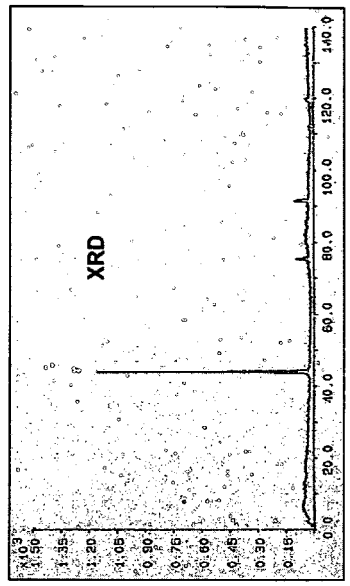
FIG. 15c is a plot of the x-ray diffraction analysis of the material depicted in FIGS. 15a and 15b.
Figure 15A:

FIGS. 15a and 15b are SEM images of nano and micro diamonds produced in accordance with one embodiment of the invention; FIG. 15c is a plot of the x-ray diffraction analysis of the material depicted in FIGS. 15a and 15b. In this example, the nano and microdiamonds are of the [100] orientation and have an average diameter of 10 to 100 μm, and were produced without the addition of a catalyst in a multizone single flame. The peak observable in FIG. 15c evidences the purity of the material produced.

FIGS. 16a and 16b are SEM images of nano and micro diamonds produced in accordance with one embodiment of the invention; FIG. 16c is a plot of the Raman spectrum of the material depicted in FIGS. 16a and 16b. In this example, the nano and microdiamonds are of the [111] orientation and have an average diameter of 10 to 100 100 μm, produce without the addition of catalyst in a multizone single flame. The peak observable in the Raman spectrum of FIG. 16c evidences the purity of the material depicted in FIGS. 16a and 16b.

From the foregoing description of specific embodiments of the invention, it should be apparent that a method and apparatus for production of nanoscale materials has been disclosed which shows great potential in terms of scalability, reliability, purity, and economy, among other advantageous features. Although specific embodiment of the invention have been described herein in some detail, this has been done solely for the purposes of illustrating various features and aspects of the invention and is in no means intended to be limiting with respect to the scope of the invention as defined in the claims which follow. It is contemplated that various substitutions, alternations, modifications, and process variations made be made relative to the embodiments specifically discussed herein without departing from the spirit and scope of the claims.

What is claimed is:

1. A method for synthesizing a carbon nanoscale material, said method comprising:
    propelling at least one stream of at least one combustible gas through a nozzle;
        wherein the nozzle has at least one outlet; and
            wherein the at least one combustible gas is discharged from the at least one outlet;
    igniting the at least one combustible gas to produce a flame at the at least one outlet;
        wherein igniting comprises burning the at least one combustible gas to produce a chemical vapor species;
    introducing an aerosolized solid material comprising a colloidal carbon material into the flame; and
    forming the carbon nanoscale material from the chemical vapor species in the absence of a metal catalyst.

2. The method of claim 1, wherein the colloidal carbon material comprises carbon black.

3. The method of claim 1, further comprising:
    introducing a coolant into the flame at a predetermined reaction time.

* * * * *